June 13, 1950    D. B. CLAPP    2,511,696
FISH STRINGING DEVICE
Filed March 25, 1947

*Inventor*
Delbert Brown Clapp

By *Clarence A. O'Brien and Harvey B. Jacobson*
*Attorneys*

Patented June 13, 1950

2,511,696

UNITED STATES PATENT OFFICE 2,511,696

FISH STRINGING DEVICE

Delbert Brown Clapp, Miami, Fla.

Application March 25, 1947, Serial No. 737,145

3 Claims. (Cl. 24—158)

The present invention relates to a novel and improved device for expeditiously and systematically stringing fish together and attaching same, temporarily, on a suspended stringer-rope.

An object of the invention is to provide a practical hook-like device having a pointed penetrating bill to penetrate the mouth of a fish in needle-like fashion, means being provided on the shank portion of the hook to close and fasten the bill in a manner to securely maintain the fish anchored on the hook until subsequently removed.

Additional novelty is predicated upon an expandable and contractable needle-like hook construction and an effective fastener, the fastener and shank having portions matchable and alignable to form eye means permitting the device to be "threaded" on an in-the-water suspension rope or other line.

The use of safetypin-like hooks and link-form stringers chained or otherwise interconnected for convenient assemblage of the batch of caught fish are not new. The difficulty with these devices is the inconvenience in carrying same, assembling and also the time and other factors involved in handling same. Besides, with the safetypin-type stringer hook, a large fish will sometimes maneuver in such a manner that it will unhook the safetypin and slip off the hook, thus liberating itself.

It is an object of the invention, therefore, to provide a resilient hook construction in which the penetrating bill is automatically spreadable to an open position and then is bent by hand to a closed position after which a clasp-type fastener is brought into use for purposes of temporarily adjoining the penetrating bill to the shank and securing said parts together for convenient results.

Other objects and advantages will become more readily apparent from the following description and the accompanying illustrative drawings.

In the drawings, wherein like numerals are employed to designate like parts throughout the views.

Figure 3:
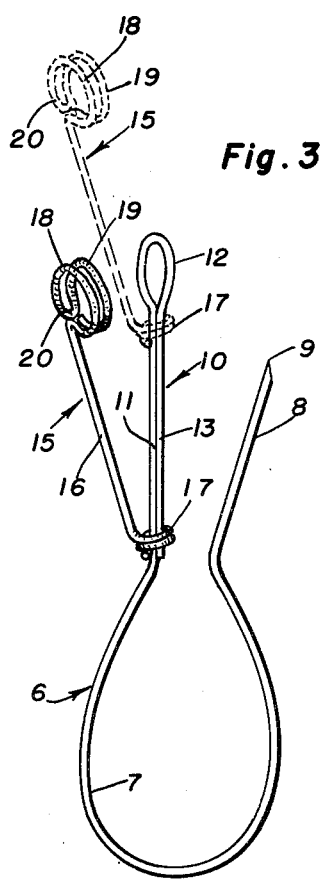
Figure 4:
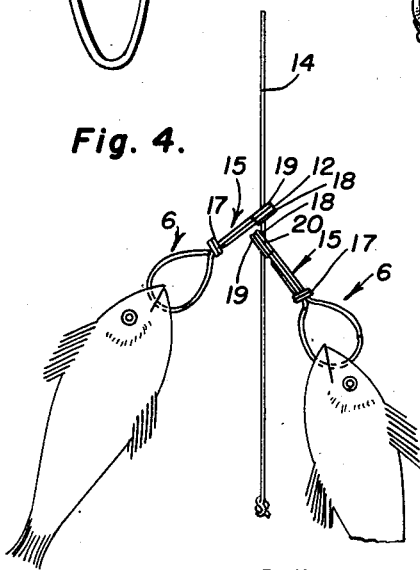

Figure 3 is a view showing the fastener and hook means together and also showing the penetrating bill spread to open position in readiness for reception of a fish and also showing the fastener in its applied position ready to be brought into use for securing opposite end portions of the hook means temporarily together for stringing purposes; and, Figure 4 is a view on a smaller scale showing two of the devices, fish attached thereto, and said devices mounted on an "overboard-type" suspension rope or equivalent element.

Referring now to the drawings and especially to Figure 3 showing the assemblage, the hook-form stringing means is denoted, generally visualized, by the numeral 6 and includes a steel or equivalent wire or rod having a looping body portion 7 terminating in a rectilinearly straight bill portion 8 having a penetrating terminal 9. The opposite end portion of the hook means constitutes a shank 10 and is actually made up of a straight portion 11, and an eye 12 in the return-bend 13. In fact, the eye 12 is formed by the return-bend 13, and said eye is adapted to accommodate passage of "overboard-type" stringer or suspension rope or equivalent line 14.

The fastener means or clip is denoted by the numeral 15 and is an independent part and comprises a rectilinearly straight wire or rod member 16 having convolutions at one end, as at 17, defining an adaptor and retaining eye. This eye is slid over the bill 8 and is threaded around the looping portion 7 to take a position as indicated in Figure 3. Parallel eye portions 18 and 19 joined by a connecting bend 20 form the outer end construction and provide embracing jaws for the eye 12.

Figure 1:
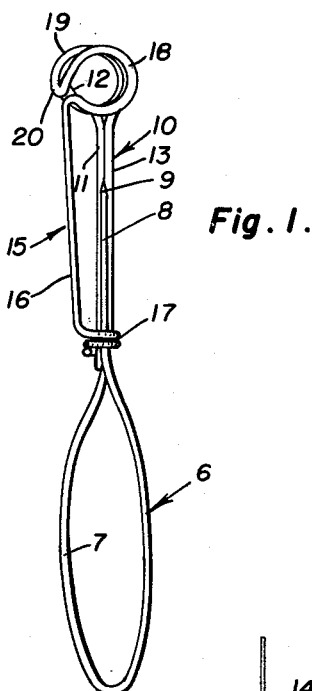
Figure 1 is a view in perspective of a fish stringer device constructed in accordance with the structural and functional principles of this invention showing the fastener applied and the hook closed.
Figure 2:
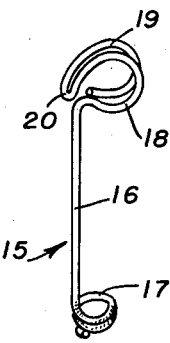
Figure 2 is a perspective view of the fastener per se, that is, this part of the device detached from the shank of the hook means.

Auxiliary eyes 18 and 19 are such and so spaced and arranged that they perform in defining a keeper which receives the primary eye of the shank as shown in Figure 1, whereupon all three elements, the main eye 12 and extra or auxiliary eyes 18 and 19 line up to form a three-part master eye which, in turn, serves to accommodate the suspension rope 14.

It is of course obvious that the fastener means 15 is applied to the hook means 6 before the fish is strung on the latter. As a matter of fact, the fastener means is normally carried by the hook means and the two parts go together in making up the fish stringer. It is also obvious that there is sufficient inherent resiliency in the metal which goes to make up the looping bend 7 to normally spread the bill in a direction away from the shank in order to provide a wide-open space to facilitate threading of the fish thereon by "needling" the pointed bill or spur through the mouth of the fish. The construction is fairly simple and the drawings are reasonably well illustrative of the details and mode of adoption and use. Moreover, fishermen and anglers are accustomed to using all sorts of appliances and accessories and it will take little or no time for the average fisherman to learn to use this appliance with ease and expedience. He will find, too, that once the fish is strung thereon, it will "stay put" and that the stringers may be strung on the suspension rope one after the other in the fashion illustrated in Figure 4. Then too, in stringing fish with this hook, no provision for spacing these stringing devices on the rope is necessary. When the first fish is caught it is put on one of the hooks and strung on the stringer rope which has a good knot tied at the lower end thereof to keep the devices and fish from slipping off. When the second or next fish is caught it is, in turn, locked on another hook and this hook is fed on the rope permitting it to slip down the rope or line into the water with the one previously caught and so on, until through fishing. The stringer hooks are just as easily removable after the "catch" is gotten home or to the market or elsewhere.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A fish stringer of the class described comprising hook means embodying a loop-like body portion terminating in a rectilinearly straight bill, said bill having a penetrating point at its outer extremity, the opposite end of said body being provided with an elongated rectilinearly straight shank and said shank terminating at its outer end in an eye, said body portion being possessed of inherent resiliency tending to automatically spring the bill in a direction away from the shank to permit the bill to be inserted and removed in needle-like fashion, and a fastener clip comprising an elongated rectilinearly straight portion having a lateral eye at one end, said eye being slidable on said shank, permitting the clip to have both sliding and swinging motion, said eye being sufficiently large to encircle said bill and to hold the latter firmly against the shank and to thus temporarily fasten the bill in fish-retaining position, said rectilinearly straight portion being provided at its opposite end with eye means adapted to register with the eye on the outer end of the shank, the latter eye in said eye means serving to permit passage of the required stringing rope therethrough, whereby the rope constitutes the means for securing the fastener clip and the latter constitutes the means for securely retaining said bill in positive contact with the shank.

2. The structure specified in claim 1, said eye means constituting a pair of spaced parallel clasping eyes, said clasping eyes being of diameter substantially corresponding to the eye on said shank, and the eye on the shank fitting in interlocking relation between said clasping eyes to properly accommodate said rope.

3. A fish stringer of the class described comprising a stringer unit formed from a single length of wire bent between its ends to provide a loop-like body portion, one end of the wire having an elongated rectilinearly straight bill portion with a penetrating terminal, the opposite opposed end portion of the wire being bent upon itself to provide a rope eye and a rectilinearly straight shank portion including a return bend, and a fastener unit comprising an elongated substantially rigid wire having a lateral eye at one end, said eye being slidably and swingably mounted on said shank, the rope eye at the outer end of the shank being of a diameter greater than the second named eye to prevent displacement of the latter, the opposite end of said second named unit being fashioned into a pair of spaced parallel clasping eyes, and said first named eye being adapted to be disposed between said clasping eyes, whereby all three eyes provide for convenient passage of the stringer rope and the second named eye serves to slidably embrace said bill to hold the latter in firm contact with the shank.

DELBERT BROWN CLAPP.

REFERENCES CITED

The following references are of record in the file of this patent:

UNITED STATES PATENTS

| Number | Name | Date |
|---|---|---|
| 135,228 | Macdonald | Jan. 28, 1873 |
| 2,297,623 | Hickman | Sept. 29, 1942 |

FOREIGN PATENTS

| Number | Country | Date |
|---|---|---|
| 122,611 | Great Britain | Jan. 30, 1919 |